United States Patent [19]

Hagquist

[11] 3,990,172

[45] Nov. 9, 1976

[54] FISHING BOBBER

[76] Inventor: Bernhard C. Hagquist, 2415 Miami St., South Bend, Ind. 46614

[22] Filed: Apr. 23, 1976

[21] Appl. No.: 679,738

[52] U.S. Cl. ............................. 43/43.14; 43/44.87; 43/44.9; 43/44.93
[51] Int. Cl.² ..................................... A01K 93/00
[58] Field of Search ............... 43/44.9, 44.91, 44.93, 43/43.14, 44.87, 43.1

[56] References Cited
UNITED STATES PATENTS

| | | | |
|---|---|---|---|
| 771,263 | 10/1904 | McCord | 43/44.91 |
| 2,500,078 | 3/1950 | Ingram | 43/44.91 |
| 3,744,176 | 7/1973 | Bondhus | 43/43.14 |

FOREIGN PATENTS OR APPLICATIONS

| | | | |
|---|---|---|---|
| 809,368 | 2/1959 | United Kingdom | 43/44.93 |

Primary Examiner—Warner H. Camp
Attorney, Agent, or Firm—Oltsch & Knoblock

[57] ABSTRACT

A fishing bobber having a hollow body member open at one end and mounting an open ended line receiving tube extending longitudinally thereof, and a buoyant body member having a releasable sealed fit on the open end of the hollow member and a bore receiving the tube with a frictional sealing fit.

7 Claims, 5 Drawing Figures

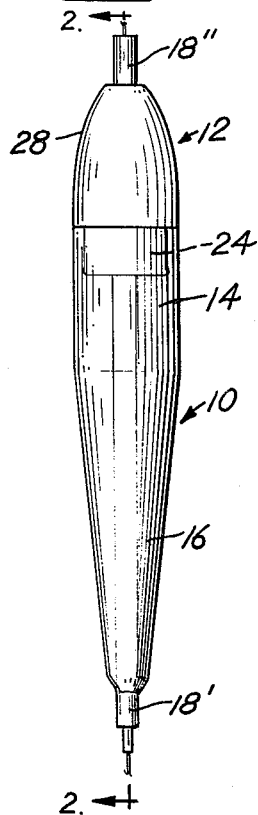
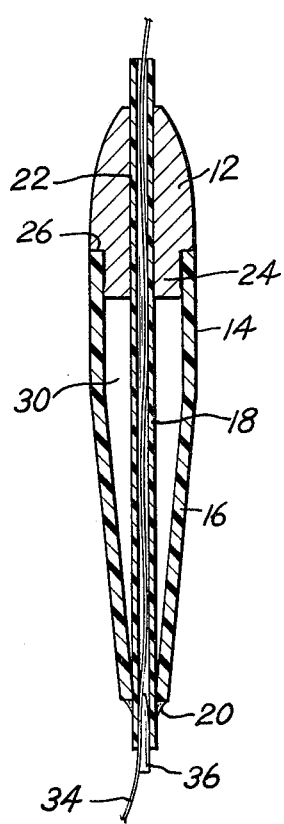
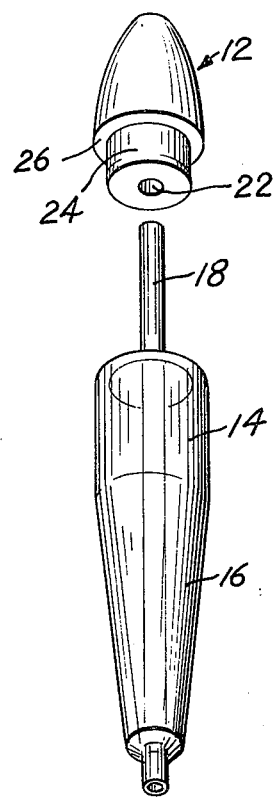
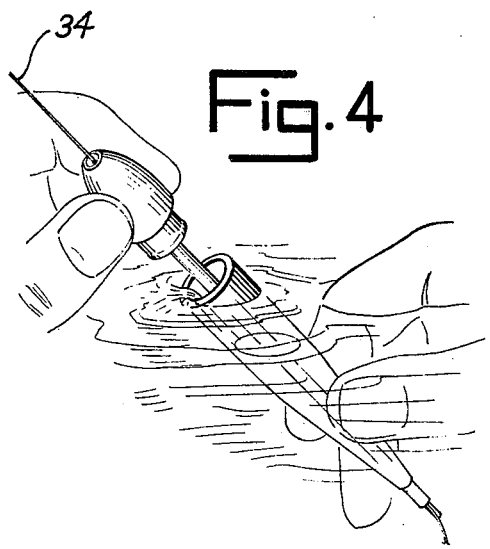
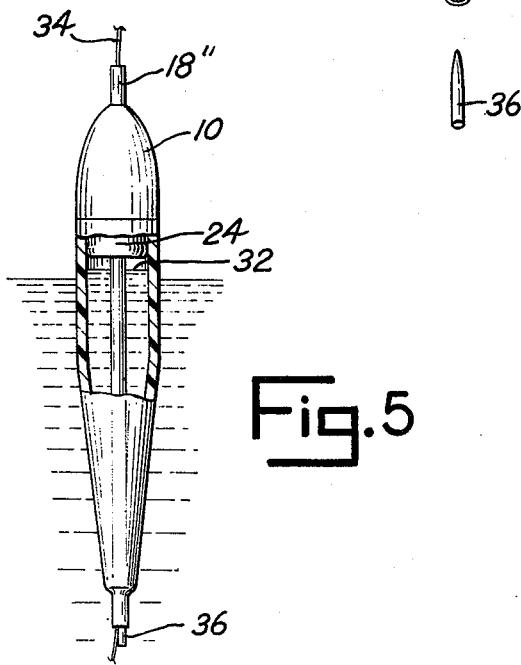

3,990,172

FISHING BOBBER

SUMMARY OF THE INVENTION

This invention relates to improvements in fishing bobbers.

Fishing bobbers of many types have been available heretofore. Most bobbers have been of limited utility in that they have been adapted for fishing of one type and have not been effective in another or different type of fishing. Thus many bobbers have bodies of light weight material, such as cork, balsa or closed cell foam resins, which renders them useful and effective during still fishing or during trolling but ineffective for use in casting because of their light weight.

It is the primary object of this invention to provide a fishing bobber which is of universal utility, in that it is adaptable to fishing of different types.

A further object is to provide a fishing bobber whose weight can be readily adjusted for use in fishing of different types.

A further object is to provide a fishing bobber having a separable two part body which may be filled with water to selected extent to regulate the weight thereof without sacrifice of the properties desired in a fishing bobber.

Other objects will be apparent from the following specification.

In the drawing:

FIG. 1 is of a view of the bobber in side elevation.

FIG. 2 is a longitudinal sectional view of the bobber taken on line 2—2 of FIG. 1.

FIG. 3 is a perspective view illustrating the component parts of the bobber.

FIG. 4 is a perspective view illustrating the preparation of the bobber by admission of water therein.

FIG. 5 is a view of the bobber as it floats in the water, parts being shown broken away.

DESCRIPTION OF THE PREFERRED EMBODIMENT

Referring to the drawing which illustrates the preferred embodiment of the invention, numeral 10 designates one part of a bobber and 12 a second part. The part 10 preferably constitutes an elongated hollow body having a substantially tubular end portion 14 and a tapered portion 16. Body part 10 is preferably formed of a rigid synthetic resin material of transparent or translucent properties. A small diameter tube 18 extends axially through the body part 10, projecting therefrom at each end. Tube 18 is cemented to the small diameter end of tapered body part 16 at 20 to fixedly anchor the tube 18 to the body part 10 and to seal the joint or interfit of the tube 18 with the body part 10, or tube 18 may be molded or otherwise formed integrally with part 10. Tube 18 preferably extends beyond one end of body part 10 at 18' for at least a short distance, and extends beyond the opposite end of body part 10 at 18'' for a substantially greater distance.

Body part 12 is preferably formed of cork, balsa wood, rigid closed cell low density foam resin, such as polyurethane, or other light weight material, and has an axial bore 22 extending therethrough. Part 12 includes a reduced diameter end portion 24 which has a snug releasable sealing fit within the mouth of the tubular portion 14 of the part 10. Part 12 has a circumferential shoulder 26 adapted to abut the end of part 14. The enlarged projecting portion 28 of part 12 is of a streamlined configuration and of a length less than the length of the portion 18'' of the tube 18 which projects beyond the end of housing part 10. The bore 22 of part 12 has a snug frictional sliding and sealing fit upon the tube 18''.

The parts are so proportioned that the body part 12 is readily separable from body part 10 and the tube 18, but when the parts are assembled the fit between the parts is such that the cavity 30 within the bobber and surrounding the tube 18 is substantially sealed against entry of water therein while the bobber is in use. By separating the body parts, as illustrated in FIG. 4, and immersing part 10 partially in water, a selected amount of water can be admitted into the cavity 30, as to the level 32 which is illustrated in FIG. 5.

In use, a fishing line 34 is passed through the tube 18, a hook or lure (not shown) is anchored on one end of the line, and the fishing bobber is anchored to the line at a selected distance from the lure as determined by the depth of water being fished or the type of fishing being done. The position of the fishing bobber upon the line is set and maintained by forcing a tapered wedging pin 36 into one end of the tube 18 alongside the line and in frictional engagement with both tube 18 and the line.

When a light weight bobber is desired, as when still fishing or trolling, all liquid may be removed from the cavity 30 while the bobber parts are separated. Then the parts can be reassembled, the line passed through the tube 18 to desired relative position, and the position of the bobber upon the line set by insertion of the wedge pin 36.

If the angler changes the type of fishing in which he engages, as from still fishing to spin casting, the bobber is readily convertible to usage under such changed fishing conditions by separating the body parts, as illustrated in FIG. 4, and immersing the body part 10 to permit entry of water to a selected depth in the cavity 30. The bobber parts are then reassembled to seal the water containing cavity, the bobber is anchored to the line at selected position by the wedge pin, and casting can begin. Under conditions in which the cavity is filled or partly filled with water, the weight of the bobber is increased so that the fishing lure and the attached bobber can readily be cast, since the weight of the bobber is now sufficient to permit it to be thrown or cast a substantial distance from the position of the caster. It will be apparent that the unit can readily be reconverted to light weight condition by separating the body parts sufficiently to permit drainage of contained liquid from the body cavity, followed by reassembly of the bobber and its anchorage at desired position upon the line.

While the preferred embodiment of the invention has been illustrated and described, it will be understood that changes in the construction may be made within the scope of the appended claims without departing from the spirit of the invention.

What I claim is:

1. A fishing bobber comprising a hollow body member open at one end, an elongated tube sealingly and fixedly anchored intermediate its ends to said hollow body and extending centrally longitudinally therethrough, a bouyant body member having a separable sealing fit on the open end of said hollow body member and having a central longitudinal bore slidably receiving said tube with a frictional seal-forming fit, said tube being open at its ends for receiving a fishing line therein, and means for anchoring said tube at selected position on said line.

2. A fishing bobber as defined in claim 1, wherein said tube projects beyond the ends of said body members when said members are assembled.

3. A fishing bobber as defined in claim 1, wherein said anchoring means constitutes a tapered wedge pin insertible in an end of said tube in frictional engagement with said tube and said line.

4. A fishing bobber as defined in claim 1, wherein said hollow body member is transparent.

5. A fishing bobber as defined in claim 1, wherein said buoyant body member includes a reduced dimension part having frictional sealing fit in the open end of said hollow body member.

6. A fishing bobber as defined in claim 5, wherein said buoyant body member includes a shoulder abutting the edge of the hollow body member at its open end.

7. A fishing bobber as defined in claim 1, wherein said hollow body member is elongated and substantially tubular adjacent its open end.

* * * * *